(12) United States Patent  
Wang

(10) Patent No.: US 8,924,954 B2  
(45) Date of Patent: Dec. 30, 2014

(54) APPLICATION SOFTWARE INSTALLATION METHOD AND APPLICATION SOFTWARE INSTALLATION APPARATUS

(71) Applicant: Huawei Technologies Co., Ltd., Shenzhen (CN)

(72) Inventor: Qifei Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 13/712,645

(22) Filed: Dec. 12, 2012

(65) Prior Publication Data

US 2013/0132942 A1 May 23, 2013

Related U.S. Application Data

(63) Continuation of application No. PCT/CN2012/079347, filed on Jul. 30, 2012.

(30) Foreign Application Priority Data

Nov. 22, 2011 (CN) .......................... 2011 1 0372932

(51) Int. Cl.
```
G06F 9/44      (2006.01)
G06F 9/445     (2006.01)
G06F 9/455     (2006.01)
```
(52) U.S. Cl.  
CPC .............. *G06F 8/61* (2013.01); *G06F 9/45504* (2013.01)  
USPC ............................ 717/174; 717/168; 717/177

(58) Field of Classification Search  
None  
See application file for complete search history.

(56) References Cited

U.S. PATENT DOCUMENTS 7,356,679 B1    4/2008  Le et al.  
7,529,897 B1 *  5/2009  Waldspurger et al. ........ 711/162

(Continued)

FOREIGN PATENT DOCUMENTS

| CN | 101425016 A | 5/2009 |
|----|-------------|--------|
| CN | 101454765 A | 6/2009 |
| CN | 102110009 A | 6/2011 |
| CN | 102214118 A | 10/2011 |
| CN | 102402446 A | 4/2012 |

OTHER PUBLICATIONS

Bakke et al., "Reduce Complexity and Accelerate Enterprise Could Infrastructure Deployments", Mar. 2013, Oracle Corporation, pp. 1-15; <http://www.oracle.com/us/solutions/eci-for-sparc-bus-wp-1659588.pdf>.*

(Continued)

*Primary Examiner* — Thuy Dao  
*Assistant Examiner* — Ben C Wang  
(74) *Attorney, Agent, or Firm* — Brinks Gilson & Lione

(57) ABSTRACT

An application software installation method and an application software installation apparatus are used to solve problems of operation complexity and high implementation difficulty in an existing installation process of application software. The method includes: mounting mirror data of a virtual machine, and mapping the mirror data as one virtual disk in a local file system; updating a registry file in a virtual disk according to registry change record data in an application software package; and updating a file structure in the virtual disk according to the file change record data and the file in the application software package, thereby implementing installation of the application software in the virtual machine. In the process of installing the application software, a user of the virtual machine does not need to perform complex operations, thereby reducing software installation difficulty.

20 Claims, 11 Drawing Sheets

(56) References Cited

U.S. PATENT DOCUMENTS

| | | | |
|---|---|---|---|
| 8,209,680 B1* | 6/2012 | Le et al. | 717/174 |
| 8,555,017 B2* | 10/2013 | McCann | 717/174 |
| 8,627,310 B2* | 1/2014 | Ashok et al. | 717/174 |
| 8,656,386 B1* | 2/2014 | Baimetov et al. | 717/168 |
| 2005/0235281 A1 | 10/2005 | Lefrancois | |
| 2006/0174238 A1* | 8/2006 | Henseler et al. | 717/168 |
| 2006/0218544 A1* | 9/2006 | Chakraborty et al. | 717/168 |
| 2007/0271561 A1 | 11/2007 | Winner et al. | |
| 2010/0031251 A1* | 2/2010 | Hsieh | 717/175 |
| 2010/0070725 A1* | 3/2010 | Prahlad et al. | 711/162 |
| 2010/0088699 A1* | 4/2010 | Sasaki | 717/177 |
| 2010/0107163 A1* | 4/2010 | Lee | 717/177 |
| 2011/0061046 A1* | 3/2011 | Phillips | 717/174 |
| 2011/0208929 A1* | 8/2011 | McCann | 717/174 |
| 2012/0084768 A1* | 4/2012 | Ashok et al. | 717/174 |
| 2012/0216181 A1* | 8/2012 | Arcese et al. | 717/168 |

OTHER PUBLICATIONS

Zhou et al., "TransCom: A Virtual Disk-Based Cloud Computing Platform for Heterogeneous Service", 2014 IEEE, Mar. 2014, vol. 11, No. 1, pp. 46-59; <http://ieeexplore.ieee.org/stamp/stamp.jsp?tp=&arnumber=6708154>.*

Krieger et al., "Enabling a Marketplace of Clouds: VMware's vCloud Director", Dec. 2010, ACM, pp. 103-114; <http://dl.acm.org/citation.cfm?id=1899928.1899942 ... 41007869>.*

Search Report issued in corresponding PCT Application No. PCT/CN2012/079347, mailed Nov. 1, 2012.

Office Action and Search Report issued in corresponding Chinese Patent Application No. 201110372932.5, mailed Jul. 23, 2013, 13 pages.

* cited by examiner

APPLICATION SOFTWARE INSTALLATION METHOD AND APPLICATION SOFTWARE INSTALLATION APPARATUS

CROSS-REFERENCE TO RELATED APPLICATIONS

This application is a continuation of International Application No. PCT/CN2012/079347, filed on Jul. 30, 2012, which claims priority to Chinese Patent Application No. 201110372932.5, filed on Nov. 22, 2011, both of which are hereby incorporated by reference in their entireties.

FIELD

The present disclosure relates to the field of computers and communications technologies, and in particular, to an application software installation method and an application software installation apparatus.

BACKGROUND

Through a hardware virtualization technology, one or more virtual machines are virtualized in one physical host, so that several or dozens of virtual machines can share hardware resources of the physical host. Cloud computing is an important application scenario of the hardware virtualization technology. The cloud computing refers to a delivery and utilization mode of an information technology infrastructure, and a user obtains needed resources in a demand-based and easily-extensible manner through a network. The cloud computing is also popularized as a delivery and utilization mode of a service, and users obtain a needed service in a demand-based and easily-extensible manner through the network. The core idea of the cloud computing is that, a large amount of resources connected through the network (resources herein include storage resources, computing resources, and various application software) are uniformly managed and scheduled, thereby forming a resource pool to provide a service for the user according to demands. The network providing resources is referred to as "cloud."

In a cloud computing scenario, and in a case that the "cloud" allocates, according to an application of the user, one virtual machine for the user to use, if the user wants to install application software in the virtual machine, an installation process includes that:

after starting the virtual machine and entering the operating system, the user manually triggers connection of a browser or a client tool to a resource server which can provide the application software, and requests downloading the application software; after downloading the application software from the resource server, the virtual machine performs installation; or after the user starts the virtual machine, an operating system of the virtual machine runs a resources updating client automatically in background mode, the client sends an online prompt message to the resource server, and after receiving the online prompt message, the resource server pushes the application software to the virtual machine according to a previously configured push policy.

In a process of implementing the present disclosure, the inventor finds that the prior art at least has the following problems: the browser or the client tool needs to be installed in the virtual machine in advance to obtain the application software which needs to be installed. Further, for how to select a safe and proper version and installation package of the application software, it is required that the user has better information technology knowledge and skills. Therefore, in the prior art, problems of operation complexity and high implementation difficulty in an installation process of the application software exist.

SUMMARY OF THE DISCLOSURE

An embodiment of the present disclosure provides an application software installation method, so as to solve problems of operation complexity and high implementation difficulty in an installation process of existing application software.

Correspondingly, embodiments of the present disclosure further provide an application software package creation method, an application software installation apparatus and an application software package creation apparatus.

In a first embodiment, an method for installing application software includes: mounting, by a processor, mirror data of a virtual machine, where the virtual machine is a virtual machine where application software is to be installed, and mapping the mirror data as one virtual disk in a local file system; updating a registry file in the virtual disk according to registry change record data in an application software package of the application software, where the application software package comprises a file which is added or modified during an installation process, the registry change record data, and file change record data, and the registry change record data and the file change record data are obtained according to a difference between a host operating system environment before installation of the application software and a host operating system environment after the installation of the application software; and updating a file structure in the virtual disk according to the file change record data and the file in the application software package, thereby implementing installation of the application software in the virtual machine.

In a second embodiment, an application software package creation method includes: acquiring a difference between a host operating system environment before installation of application software and a host operating system environment after the installation of the application software; determining registry change record data and file change record data according to the difference; and generating an application software package which comprises the registry change record data, the file change record data and a file which is added or modified in the host during a program installation process.

In a third embodiment, an application software installation apparatus includes: a mounting module, configured to mount mirror data of a virtual machine, where the virtual machine is a virtual machine where application software is to be installed, and map the mirror data as one virtual disk in a local file system; a first update module, configured to update a registry file in the virtual disk according to registry change record data in an application software package of the application software, where the application software package comprises a file which is added or modified during an installation process, the registry change record data, and file change record data, and the registry change record data and the file change record data are obtained according to a difference between a host operating system environment before installation of the application software and a host operating system environment after the installation of the application software; and a second update module, configured to update a file structure in the virtual disk according to the file change record data and the file in the application software package, thereby implementing installation of the application software in the virtual machine.

In a fourth embodiment, an application software package creation apparatus includes: an acquisition unit, configured to acquire a difference between a host operating system environment before installation of application software and a host operating system environment after the installation of the application software; a determining unit, configured to determine registry change record data and file change record data according to the difference obtained by the acquisition unit; and a creation unit, configured to generate an application software package, where the application software package comprises the registry change record data and the file change record data which are determined by the determining unit, and a file which is added or modified in the host during a program installation process.

In the embodiments of the present disclosure, first the mirror data of the virtual machine where the application software is to be installed is mounted, and the mirror data is mapped as the virtual disk in a file system of the software installation server first; then the registry file in the driver is updated according to the registry change record data of the application software package; and the file structure in the virtual disk is updated according to the file added or modified during the installation process and the file change record data which are in the application software package, thereby achieving an objective of installing the application software. During the application software installation process, neither the browser or the client tool needs to be installed in the virtual machine in advance, nor a user of the virtual machine needs to perform complex operations, thereby reducing software installation difficulty for the user.

BRIEF DESCRIPTION OF THE DRAWINGS

To illustrate solutions in embodiments of the present disclosure or in the prior art more clearly, accompanying drawings required for describing the embodiments or the prior art are introduced briefly in the following. Apparently, the accompanying drawings in the following description merely show some embodiments of the present disclosure, and persons of ordinary skill in the art can derive other drawings from these accompanying drawings without creative efforts.

DETAILED DESCRIPTION OF THE EMBODIMENTS

In prior art, in addition to existence of problems of operation complexity and high implementation difficulty during an installation process, and due to a difference of firewall configuration in each virtual machine, a case that the installation can succeed in some virtual machines but fails in other virtual machines may occur when a user adopts a similar installation process.

In addition, when application software needs to be installed on a large number of virtual machines in a certain area due to considerations in aspects such as security and reliability, defects of low efficiency and being uncontrollable still exist in adoption of an existing installation method.

The following describes major principles, implementation manners, and beneficial effects of the solution in embodiments of the present disclosure with reference to each accompanying drawing.

Figure 1:
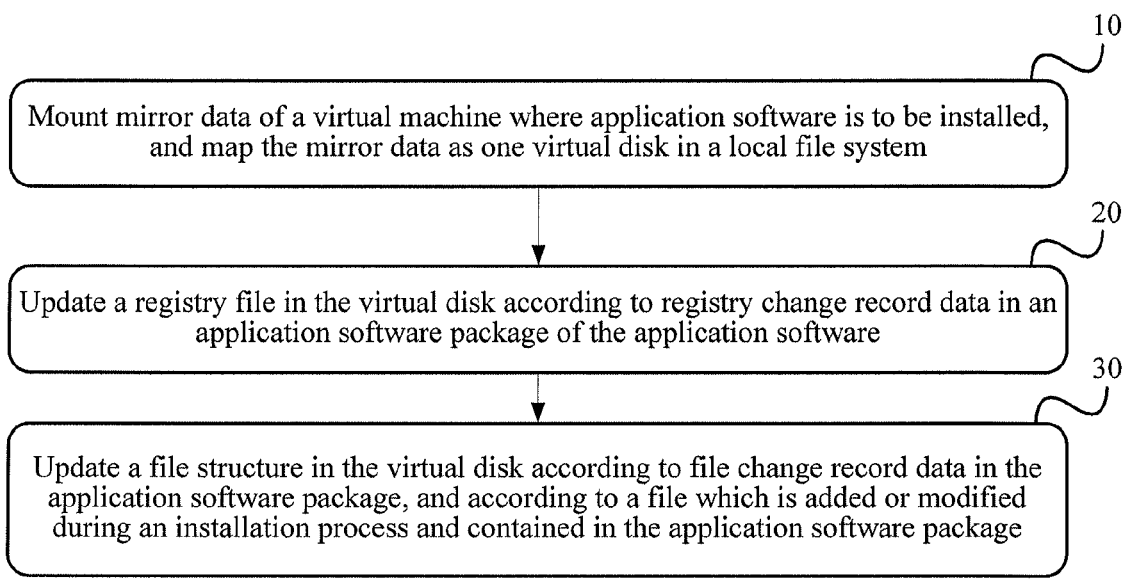
FIG. 1 is a flow chart of a main implementation principle of an embodiment of the present disclosure.

As shown in FIG. 1, a main implementation principle of an embodiment of the present disclosure is as follows.

Step 10: Mount mirror data of a virtual machine where application software is to be installed, and map the mirror data as one virtual disk in a local file system.

The mirror data refers to a static storage form of a virtual machine instance, which comprises an operating system file of the virtual machine and a user file. In cloud computing infrastructure architecture, storage resources and running resources of the virtual machine may be distributed in different physical entities. When a virtual machine is allocated for a certain user to use, a physical host used to start the virtual machine loads mirror data of the virtual machine to achieve an objective of starting the virtual machine.

A storage manner of load content of the mirror data (including the operating system file of the virtual machine, the user file and so on) is the same as a storage manner of data in a personal computer, that is, the definition of a field in a physical magnetic disk sector used to store data is the same. The difference lies in that different virtual machine manufacturers perform encapsulation and add a data head on the basis of the load content, or some manufacturers further performs processing such as compression on the mirror data.

Specifically, for the mounting, forms of operation results of mounting are different in different operating systems. In this embodiment, the virtual disk refers to a storage object that can be identified by an operating system of a software installation server. In a case that the software installation server has an operating system of Windows series, after the mounting is completed, the mirror data is mapped as one driver in a file system of the software installation server. In a case that the software installation server has an operating system of Linux and UNIX series, after the mounting is completed, the mirror data is mapped as a block device in the file system of the software installation server. A subsequent operating principle of either the driver or the block device is basically the same.

Step 20: Update a registry file in the virtual disk according to registry change record data in an application software package of the application software.

Persons skilled in the art can understand that, organization manners of the data may be multiple, and cannot be described in detail. Optionally, this embodiment provides an organization manner of three kinds of data, namely, the registry change record data, file change record data, and a file added or modified during an installation process which are contained in the application software package:

The application software package comprises a change record file and the file which is added or modified during the installation process.

The change record file at least comprises the registry change record data and the file change record data, where the registry change record data and the file change record data are obtained by executing an installation program of the application software in the host (for example, a physical host) in advance, and by performing comparison to find a difference between a snapshot of a host operating system environment before running of the installation program and a snapshot of a host operating system environment after running of the installation program. Specifically, the registry change record data is obtained by performing comparison to find a difference between registry files in the snapshots before and after execution of the software installation program; and the registry change record data includes an added, deleted or modified key, and an added, deleted or modified value. The file change record data is obtained by performing comparison to find a difference between file structures in the snapshots before and after the running of the software installation program; and the file change record data includes a record of adding, deleting or modifying a file in a magnetic disk, or a record of adding, deleting or modifying a directory.

Step 30: Update a file structure in the virtual disk according to the file change record data in the application software package, and according to the file which is added or modified during the installation process and contained in the application software package.

In step 10, the mirror data of the virtual machine where the application software is to be installed may be generated according to a hardware configuration parameter and an operating system version identifier which are input when a user applies for the virtual machine, that is, the mirror data is generated during a virtual machine creation process. In this case, the application software package is acquired from an application software resource repository according to a pre-installation software identifier which is input at the time of applying for the virtual machine. The mirror data of the virtual machine where the application software is to be installed may also be obtained according to an acquired storage address, where the storage address is acquired by acquiring a storage location of the mirror data of the virtual machine after virtual machine creation is completed and a to-be-installed software identifier designated by the user is received. In this case, the application software package is found from the application software resource repository according to the pre-installation software identifier input by the user, or a to-be-installed software identifier indicated by a virtual machine management system.

It should be noted that, there is no limitation on an execution sequence of step 20 and step 30 above, after step 20 and step 30 are executed, the objective of installing the application software in the virtual machine may be achieved.

The main implementation principle of the method of the present disclosure is described and illustrated in detail by introducing four embodiments in detail according to the foregoing inventive principle of the present disclosure.

Embodiment 1

Figure 2A:
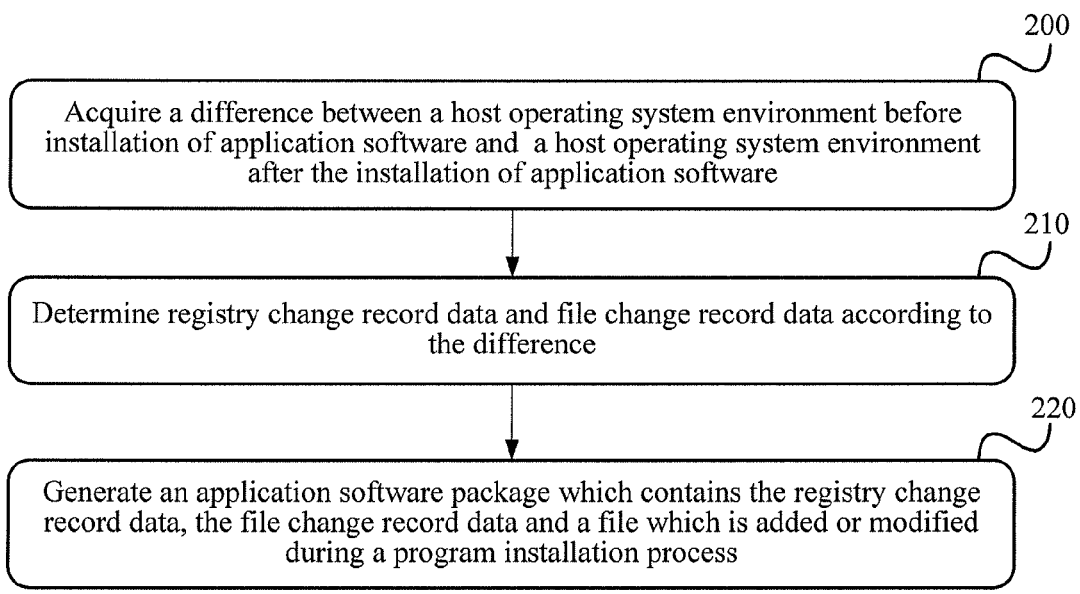
FIG. 2a is a flow chart of an application software package creation process according to an embodiment of the present disclosure.

FIG. 2a is a flow chart of an application software package creation process according to an embodiment of the present disclosure.

Step 200: An application software package creation apparatus acquires a difference between a host operating system environment before installation of application software and a host operating system environment after the installation of the application software.

Step 210: The application software package creation apparatus determines registry change record data and file change record data according to the difference.

The registry change record data comprises an added, deleted or modified key, or an added, deleted or modified value in a host registry after the installation of the application software. Definitely, the registry change record data may not only contain the added, deleted or modified key in the registry, but also contain the added, deleted or modified value.

The file change record data comprises a record of adding, deleting or modifying a file, or a record of adding, deleting or modifying a directory in the magnetic disk after the installation of the application software.

Step 220: The application software package creation apparatus generates an application software package which comprises the registry change record data, the file change record data and a file which is added or modified during a program installation process.

Optionally, a manner for acquiring a difference between a host operating system environment before installation of application software and a host operating system environment after the installation of the application software in step 200, includes, but is not limited to the following three kinds.

Figure 2B:
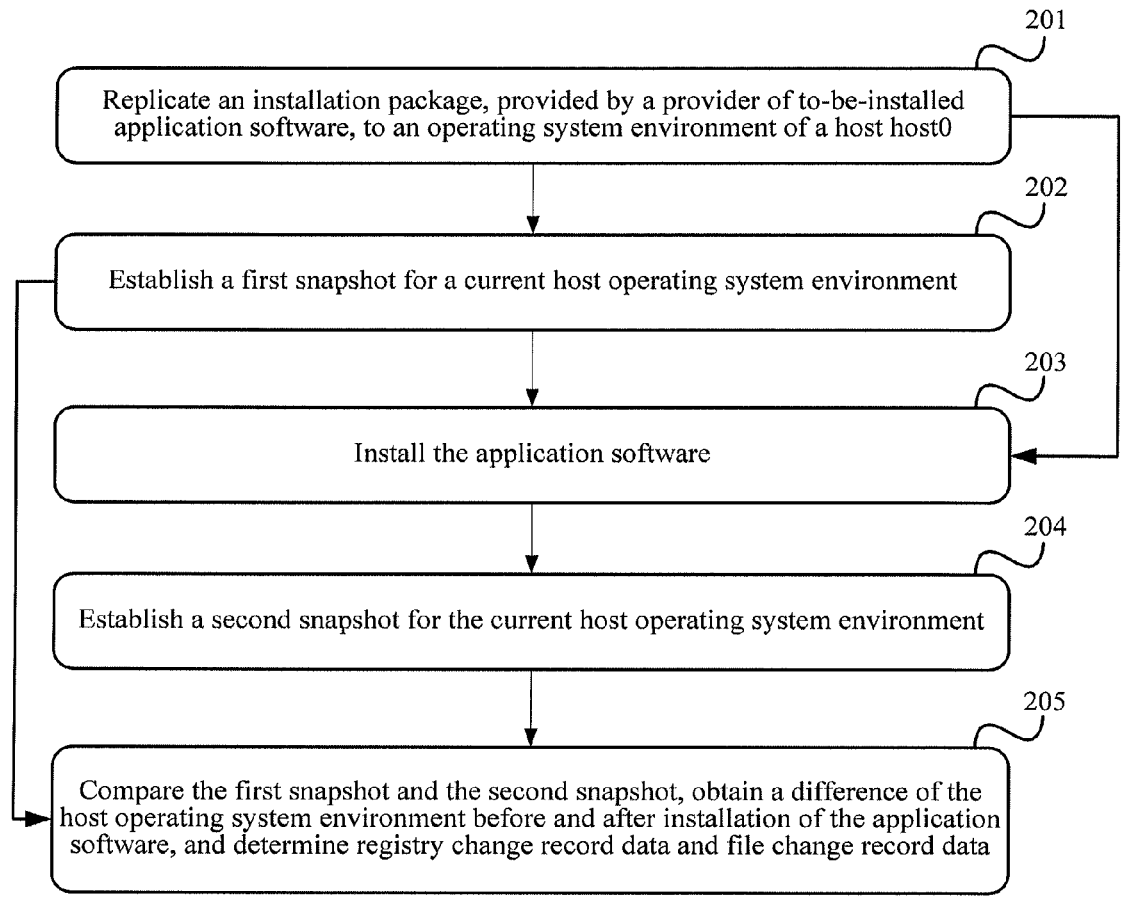
FIG. 2b is a flow chart of a manner for acquiring a difference between a host operating system environment before installation of application software and a host operating system environment after the installation of the application software according to an embodiment of the present disclosure.

Manner 1: Referring to FIG. 2b.

Step 201: The application software package creation apparatus replicates an installation package of the to-be-installed application software to an operating system environment of a host host0, where the installation package is provided by an application software provider.

Optionally, to reduce unnecessary junk information when a snapshot is generated, and improve snapshot comparison efficiency subsequently, the application software package creation apparatus should select, according to information in a registry file, a host with a "clean" operating system environment as a dedicated host used to create the application software package. The "clean" operating system environment refers to an operating system having as less unnecessary application software installed as possible, for example, an operating system having no other application software installed.

Step 202: The application software package creation apparatus establishes a first snapshot for a current host operating system environment. The host operating system environment includes a registry and a magnetic disk.

The registry (Registry) is an important database in the operating system, and is used to store configuration information of the system and an application program.

Establishing a snapshot for the registry refers to recording all keys and values in the registry in an enumeration manner. Establishing a snapshot for the magnetic disk refers to recording, in an enumeration manner, file structure information on the magnetic disk, that is, information such as all directories and files, and storage paths, modification time and sizes of the directories and files.

The first snapshot established at this time reflects state information of the registry and the magnetic disk of host0 before the installation of the application software.

Step 203: The application software package creation apparatus installs the application software in the host host0.

For example, an existing application software package usually comprises an installation program in an executable file format, such as setup.exe, and the objective of installing the application software may be achieved by running the installation program.

Step 204: The application software package creation apparatus establishes a second snapshot for the current host operating system environment.

For a snapshot establishment method, reference may be made to the introduction in step 202. The second snapshot established at this time reflects state information of the registry and the magnetic disk of host0 after the installation of the application software.

Step 205: The application software package creation apparatus compares the first snapshot and the second snapshot, determines the difference between the host operating system environment before the installation of the application software and the host operating system environment after the installation of the application software according to a difference between the first snapshot and the second snapshot, and obtains the registry change record data and the file change record data therefrom. Optionally, in order to accelerate comparison efficiency, a comparison scope in the magnetic disk may be designated in advance. For example, it is designated that only changes of a file and a directory in a predetermined magnetic disk sector or under a predetermined storage path are compared.

Manner 2: Select two hosts with exactly same operating system environments in advance, namely, host1 and host2. The application software package creation apparatus replicates an installation package, provided by a provider of the to-be-installed application software, to the operating system environment of the host host2, and runs an installation program in the installation package in host2. The application software package creation apparatus performs comparison to find a difference between operating system environments of host1 and host2 at this time, so as to obtain the difference between the host operating system environment before installation of the application software and a host operating system environment after the installation of the application software.

Manner 3: The application software package creation apparatus decompiles an installation program in an installation package provided by an application software provider, so as to obtain, from a decompiling result, an operator performed on the operating system environment. For example: an operator of a registry file is modified, and an operator of a file is added or modified in a file system, so as to deduce an expected difference between the host operating system environment before installation of the application software and the host operating system environment after the installation of the application software.

Figure 2C:
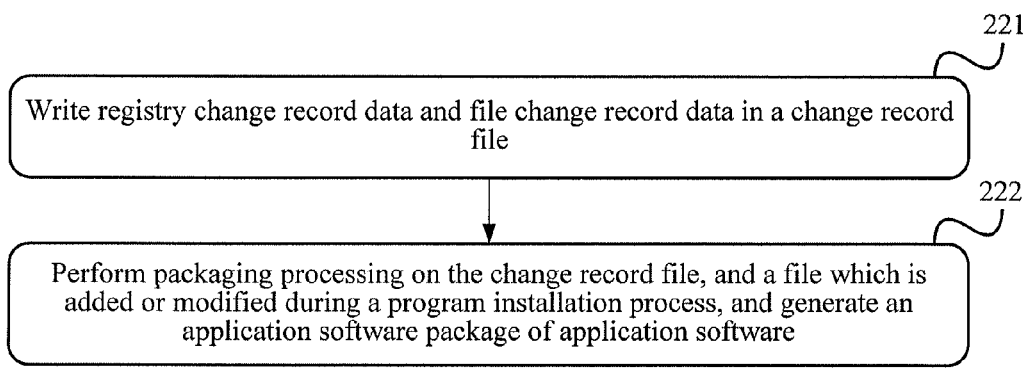
FIG. 2c is a flow chart of generating an application software package according to an embodiment of the present disclosure.

Optionally, referring to FIG. 2c, the process of generating the application software package in step 220 includes the following.

Step 221: Write the registry change record data and the file change record data in a change record file.

Optionally, description language such as extensible markup language (XML, Extensible Markup Language) may be used to describe the registry change record data and the file change record data, and write the registry change record data and the file change record data, which are described in the description language, in the change record file. The format of the change record file is not limited, and the file may also be a text format file.

Step 222: Perform packaging processing on the change record file and the file which is added or modified during the program installation process, and generate the application software package of the application software.

Figure 2D:
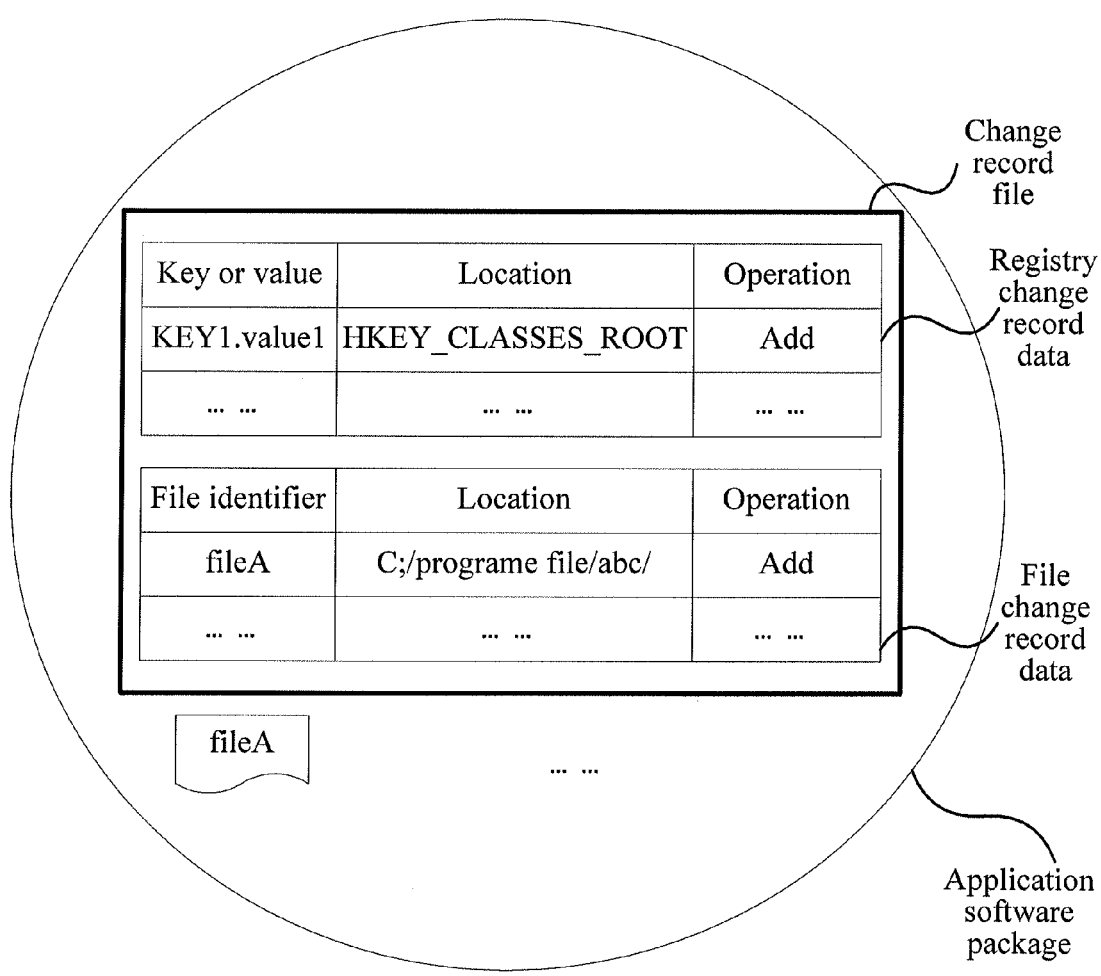
FIG. 2d is a schematic diagram of an application software package according to an embodiment of the present disclosure.

FIG. 2d is a schematic diagram of an application software package according to an embodiment of the present disclosure, where the change record file records that a file named fileA is added in a path C:/programe file/abc/, and a value key1.value1 is added in the registry. The application software package further comprises the added file fileA.

Optionally, through a packaging program, for example, rar (Roshal ARchive), and zip, the change record file and the file which is added or modified during the installation program process are packaged and encapsulated, so as to generate the application software package.

It should be noted that: the foregoing first snapshot and the second snapshot are not used to indicate a sequence relationship, but to distinguish different snapshots, the "first" and the "second" mentioned in future are also used to distinguish different information, data, requests, messages or unit modules.

The embodiment of the present disclosure provides an application software package creation solution, where by using the application software package created through the creation solution, the mirror data of the virtual machine may be modified, so as to achieve the objective of installing the application software in the virtual machine.

Embodiment 2

Figure 3A:
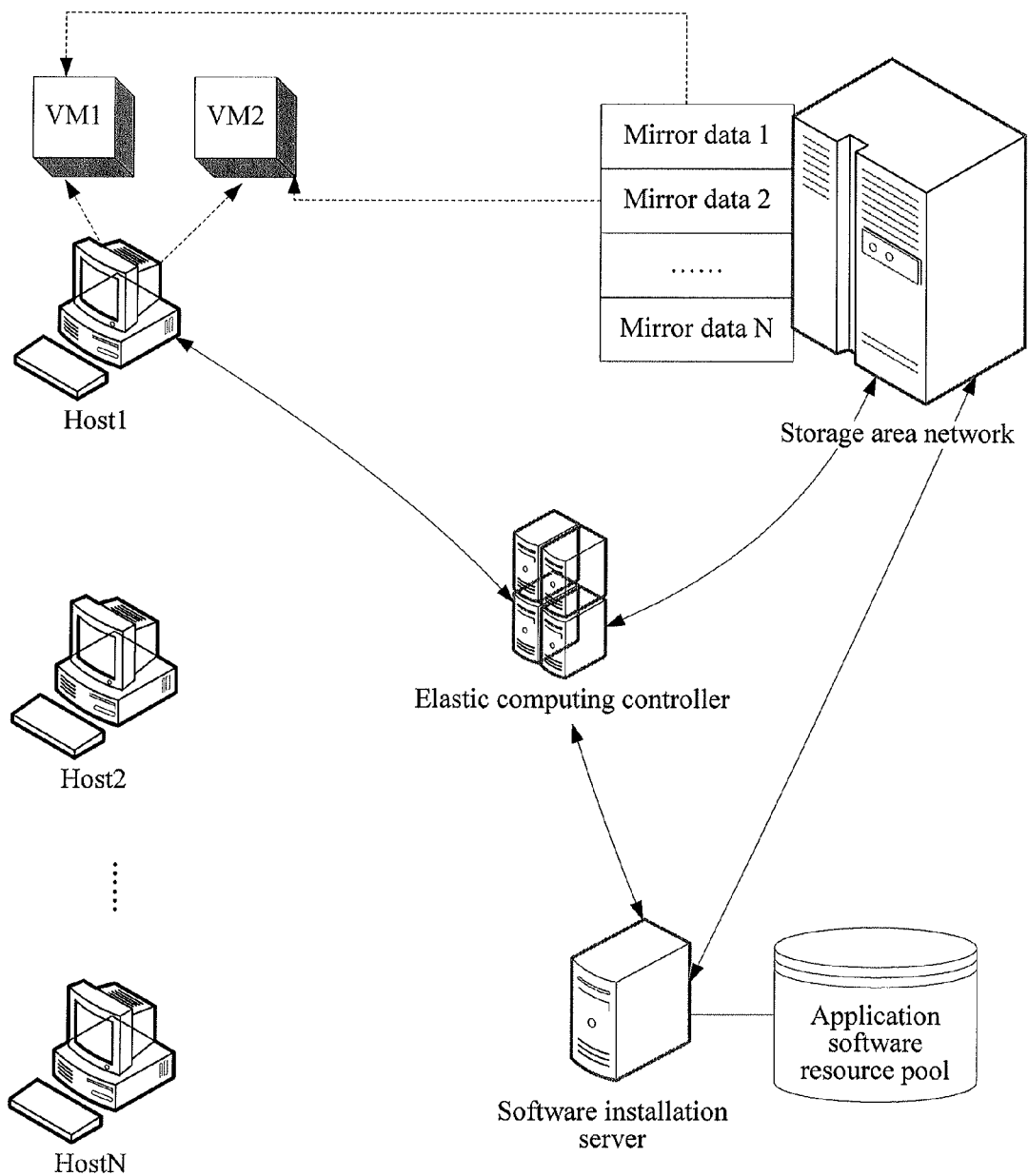
FIG. 3a is a schematic diagram of a deployment environment of a software installation system according to an embodiment of the present disclosure.

FIG. 3a is a schematic diagram of a deployment environment of a software installation system according to an embodiment of the present disclosure, and is a typical kind of cloud computing infrastructure architecture. The system includes at least one software installation server, at least one elastic computing controller, at least one physical host, and a distributed storage device. The elastic computing controller is a core component in existing cloud computing infrastructure architecture, and is a center for managing storage resources, computation resources, and other resources. The elastic computing controller allocates storage resources and computation resources for a user according to an application of the user, and controls creation of mirror data of a virtual machine in the distributed storage device. In this embodiment, mirror data of each virtual machine is stored in the distributed storage device, and examples of SAN and NAS are taken for illustration of the distributed storage device. The software installation server is connected to an application software resource repository, and the application software resource repository stores at least one application software package created by using the method shown in FIG. 2a.

It should be noted that: FIG. 3a only shows an example of the cloud computing infrastructure architecture, and a software installation method provided by the embodiment of the present disclosure is also applicable to other architecture scenarios.

The embodiment of the present disclosure provides an application software installation method. The installation method is performed in a scenario shown in FIG. 3a and is based on the application software package created in the method shown in FIG. 2a, and is used to implement software installation during a process that the user applies for the virtual machine. For a specific procedure, reference may be made to FIG. 4.

Step 410: The elastic computing controller receives a hardware configuration parameter, an operating system version identifier, and a pre-installation software identifier which are input when the user applies for the virtual machine.

When applying for the virtual machine, the user may select, according to several configuration options which can be supported by a virtual machine management system and are provided by a virtual machine application page, the hardware configuration parameter, the operating system version identifier, and the pre-installation software identifier that the virtual machine which is applied for should have. The user may send a virtual machine application request message through a client tool in the physical host, where the request message carries the selected hardware configuration parameter, operating system version identifier, and pre-installation software identifier.

Definitely, the foregoing hardware configuration parameter, operating system version identifier, and pre-installation software identifier may also be default configuration options provided by the virtual machine management system. For example, when the user selecting typical installation, the mirror data is generated according to a default configuration parameter, a default operating system version identifier, and a default pre-installation software identifier.

Step 420: The elastic computing controller controls creation of the mirror data of the virtual machine in the distributed storage device according to the hardware configuration parameter and the operating system version identifier which are input when the user applies for the virtual machine.

Specifically, a hardware specification of the virtual machine are configured according to the hardware configuration parameter, a corresponding operating system template is selected from an operating system template set according to the operating system version identifier; and the mirror data of the virtual machine is created according to the hardware specification of the virtual machine and the operating system template. In this embodiment, mirror data WMdata1 of a virtual machine VM1 is created according to the user application.

Figure 3B:
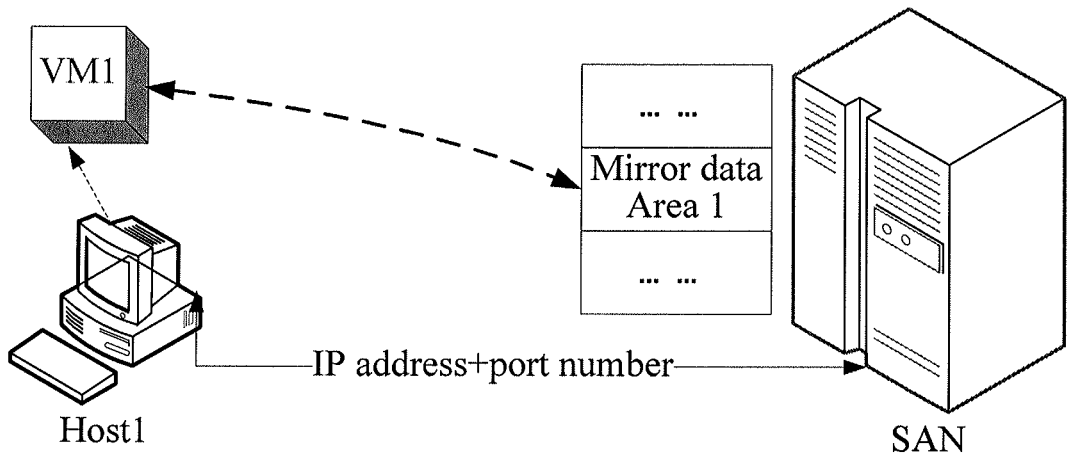
FIG. 3b is a schematic diagram of storage of mirror data in a storage area network (SAN, Storage Area Network) according to an embodiment of the present disclosure.

A storage manner of mirror data in the distributed storage device is relevant to the type of the distributed storage device. For example, for an SAN, the mirror data of the virtual machine is hard disk sector data in designated storage space (that is, a virtual machine mirror data area). Other devices, for example, a physical host used to start the virtual machine, may access, in a manner of carrying "IP address+port number" in an access request, a virtual machine mirror data area corresponding to a to-be-started virtual machine on the SAN, where the "IP address+port number" corresponds to a storage area in the SAN. It is shown in FIG. 3b.

Figure 3C:
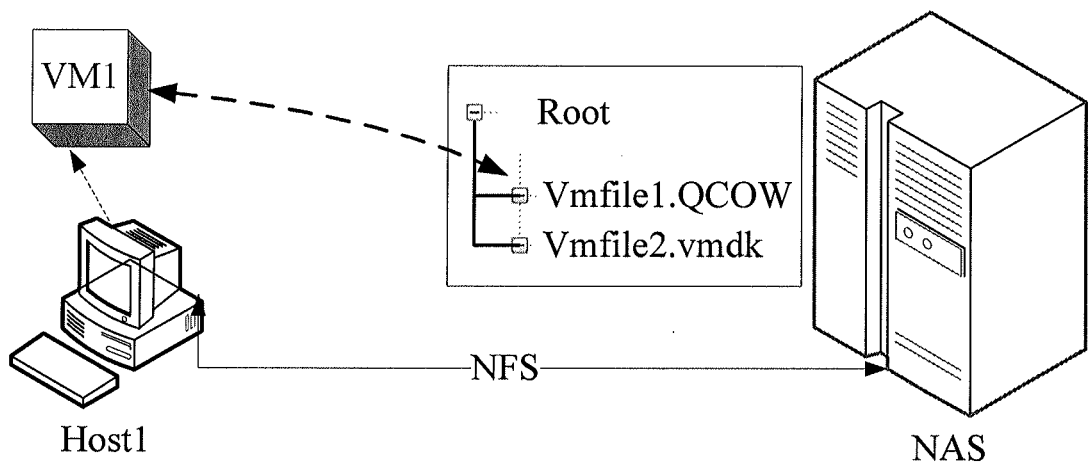
FIG. 3c is a schematic diagram of storage of mirror data in network attached storage (NAS, Network Attached Storage) according to an embodiment of the present disclosure.

For an NAS, the mirror data of the virtual machine is a mirror file under a designated storage path. Other devices, for example, the physical host used to start the virtual machine, may access, through a network file system (NFS, Network File System), a virtual machine mirror file corresponding to a to-be-started virtual machine on the NAS. It is shown in FIG. 3c.

In Table 1, mirror data of virtual machines VM1 and VM2 is stored in the NAS, and mirror data of a virtual machine VM3 is stored in the NAS.

It should be noted that: FIG. 3a only shows an example of a cloud computing infrastructure architecture, and the application software installation method provided by the embodiment of the present disclosure is also applicable to other architecture scenarios. For example, in other architecture scenarios, a management database maintains correspondence between a virtual machine identifier and a mirror data address.

TABLE 1

| Virtual machine identifier | Identifier of physical host used to start virtual machine | Storage address of mirror data of virtual machine |
|---|---|---|
| VM1 | Host1 | 192.168.0.1:/vmimages/vm1.QCOW |
| VM2 | Host1 | 192.168.0.1:/vmimages/vm2.vmdk |
| VM3 | Host2 | 192.168.0.2:10000 |
| ... | ... | ... |

Step 430: The software installation server determines a type of the mirror data of the virtual machine.

Optionally, a manner for determining the type of the mirror data includes, but is not limited to:

Manner 1:

The software installation server first tests whether a data head of the mirror data can be successfully read from a storage location of the mirror data of the virtual machine, where the storage location of the mirror data of the virtual machine may be notified to the software installation server by the SAN or NAS.

If the data head of the mirror data can be successfully read, the type of the mirror data is determined according to the data head. For example, a file type field in the data head is read according to definition of a mirror data format, and the read field is compared with each type identifier. If consistent, it is determined that the type of the mirror data of the virtual machine is a file type which corresponds to a type identifier consistent with the read field. The type of the mirror data includes QCOW (QEMU Copy-on-write), a VMDK (VMWare Virtual machine Disk Format), a VHD (Microsoft Virtual Hard Disk format), a VDI (Sun xVM VirtualBox Virtual Disk Images) and so on, and multiple mirror data types may be compatible in one virtual machine system.

If the data head of the mirror data cannot be successfully read, it is tested that whether the mirror data can be successfully parsed according to an RAW format, and if the parsing operation is successfully, it is determined that the type of the mirror data is in the RAW format. A manner for storing mirror data in the RAW format is the same as a manner for storing data in a personal computer, that is, the mirror data is in 1:1 correspondence with physical magnetic disk data, and the mirror data is not generated by performing encapsulation on the physical magnetic disk data. Therefore, parsing is performed according to a physical magnetic disk data format. A feature of the physical magnetic disk format includes, but is not limited to that: a $0^{th}$ sector (first 512 bytes) is a main boot record (MBR, Main Boot Record), and a signature word "55AA" exists at the end of the sector; taking an initial location of the $0^{th}$ sector as a reference, data whose offset is 01BEH-01FDH is a magnetic disk partition table, which comprises a field describing a file system identifier of each partition, and so on.

Manner 2:

When creating mirror data corresponding to a virtual machine instance according to a virtual machine application of the user, a type identifier of mirror data of each virtual machine is recorded in the database. In this embodiment, the type identifier may be recorded in a management list maintained by the elastic computing controller, as shown in Table 2. When the software installation server needs to know a type of mirror data of a certain virtual machine, for example, when a type of mirror data of a virtual machine VM1 needs to be known, the software installation server performs message interaction with the elastic computing controller, to obtain the type of the mirror data stored in the management list of the elastic computing controller. For example, the software installation server sends, to the elastic computing controller, a type confirmation request message carrying a virtual machine identifier "VM1" or a storage location "192.168.0.1:/vmimages/vm1.QCOW" of the mirror data of the virtual machine, the elastic computing controller queries a management list according to the carried virtual machine identifier or storage location of the mirror data of the virtual machine, and carries a found type "raw" of the mirror data in a type confirmation response message and returns the message to the software installation server. The software installation server extracts the carried type of the mirror data from the type confirmation response message.

TABLE 2

| Virtual machine identifier | Identifier of physical host used to start virtual machine | Storage address of mirror data of virtual machine | Type of mirror data |
|---|---|---|---|
| VM1 | Host1 | 192.168.0.1:/vmimages/vm1.QCOW | QCOW |
| VM2 | Host1 | 192.168.0.1:/vmimages/vm1.QCOW | vmdk |
| VM3 | Host2 | 192.168.0.2:10000 | raw |
| ... | ... | ... | |

In this embodiment, the type of the mirror data WMdata1 of the virtual machine created for the user is QCOW.

Step 440: The software installation server invokes, according to the type of the mirror data, a corresponding mounting program to mount the mirror data of the virtual machine.

In this embodiment, according to the type QCOW of the mirror data WMdata1, the software installation server invokes the mounting program corresponding to the file type QCOW, to mount the mirror data WMdata1.

Most existing operating systems provide a command or a command set which can implement a mounting function, such as commands mount and kpartx in a linux system.

During the mounting process, a file system type (that is, a file system type of the virtual machine) inside the mirror data of the virtual machine is determined according to correspondence between the type of the mirror data and the file system type. The file system type inside the mirror data may be a 16-bit file allocation table (FAT16, File Allocation Table), an FAT32, a second extended file system (EXT2, Second extended file system), a third extended file system (EXT3, Third extended file system), a network file system (NTFS, Network File System) and so on. A driver program corresponding to the file system type needs to be used during the mounting process to implement support to a file system.

For the SAN, the hard disk sector data in the designated storage space, after being processed by the driver program, is mapped as a driver, where the driver includes several files.

For the NAS, the mirror file under the designated storage path, after being processed by the driver program, is mapped as a driver, where the driver includes several files.

After the mounting is completed, the mirror data is mapped as one driver in a file system of the software installation server, a subsequent operation on a file in the driver is equivalent to an operation on a file in the virtual machine.

After mounting the mirror data WMdata1, the software installation server maps the mirror data as a driver DriverW1.

Step 450: The software installation server acquires a corresponding application software package from the application software resource repository according to the pre-installation software identifier.

In this embodiment, installation of an application software package clock-Package corresponding to timer software is taken as an example for illustration. The application software package comprises a change record file, and a file which is modified or added during an installation process. The change record file includes registry change record data and file change record data.

Step 460: The software installation server updates a registry file in the driver according to the registry change record data in the change record file contained in the application software package.

In this embodiment, an example is taken that the operating system version identifier input when the user applies for the virtual machine is WindowsXP, the registry file contained in the driverDriverW1 after a mirror file is mounted includes:

DriverW1:544 WINDOWS\system32\config\SAM
DriverW1:544 WINDOWS\system32\config\SECURITY
DriverW1:544 WINDOWS\system32\config\software
DriverW1:\WINDOWS\system32\config\system
DriverW1:\WINDOWS\system32\config\default
DriverW1:\Documents and Settings\Local Service\NTUSER.DAT
DriverW1:544 Documents and Settings\LocalService\Local Settings\Application Data\Microsoft\Windows\UsrClass.dat
DriverW1:\Documents and Settings\NetworkService\NTUSER.DAT
DriverW1:\Documents and Settings\NetworkService\Local Settings\Application Data\Microsoft\Windows\UsrClass.dat
DriverW1:\Documents and Settings\Administrator\NTUSER.DAT
DriverW1:\Documents and Settings\Administrator\Local Settings\Application Data\Microsoft\Windows\UsrClass.dat A format of the registry file may be an HIVE format, and one HIVE file is formed by multiple bins (BIN). A file head (basic block) exists at the head of the HIVE file, and is used to describe some global information of the HIVE file. One BIN is formed by multiple cells (CELL), and the CELL may be classified into 5 specific types (a key cell, a value cell, a sub-key list cell, a value list cell, and a security descriptor cell), used to store different registry data. Content in the foregoing registry file may be mapped into a registry tree logically. For specific illustration, reference may be made to relevant documents, and the details are not described herein.

The registry change record data in the change record file comprises content of one CELL of at least one of the foregoing registry files (that is, at least one key or value), and a type of an operation to be performed on the CELL, such as adding, deletion or modification.

The registry file in the driver DriverW1 is updated according to the content of the CELL and the type of the operation to be performed on the CELL which are contained in the registry change record data, and according to the location of the key or the value corresponding to the CELL.

Step 470: The software installation server updates a file structure in the driver according to the file which is added or modified during the installation process and contained in the application software package, and according to the file change record data in the change record file.

The software installation server adds, deletes or modifies a file, or adds, deletes or modifies a directory in the driver according to the file change record data in the change record file, so as to update the file structure in the driver. Specifically, a file under a corresponding path is deleted in a magnetic disk according to a file deleting record in the file change record data; or a file is added in the magnetic disk according to a file adding record in the file change record data, and according to the file which is added during the installation process and contained in the application software package; or an existed file is modified in the magnetic disk according to a file modifying record in the file change record data, and according to the file which is modified during the installation process and contained in the application software package. The added, deleted or modified file has corresponding path information, and a file operation may be implemented through a scriptlet.

Step 480: The software installation server cancels mounting the mirror data of the virtual machine.

When the virtual machine needs to be started subsequently, and after the physical host used to start the virtual machine reads the mirror data processed in step 430 to step 480 from a storage address of the mirror data of the virtual machine and loads the mirror data, the application software has already been installed on the started virtual machine.

Figure 5:
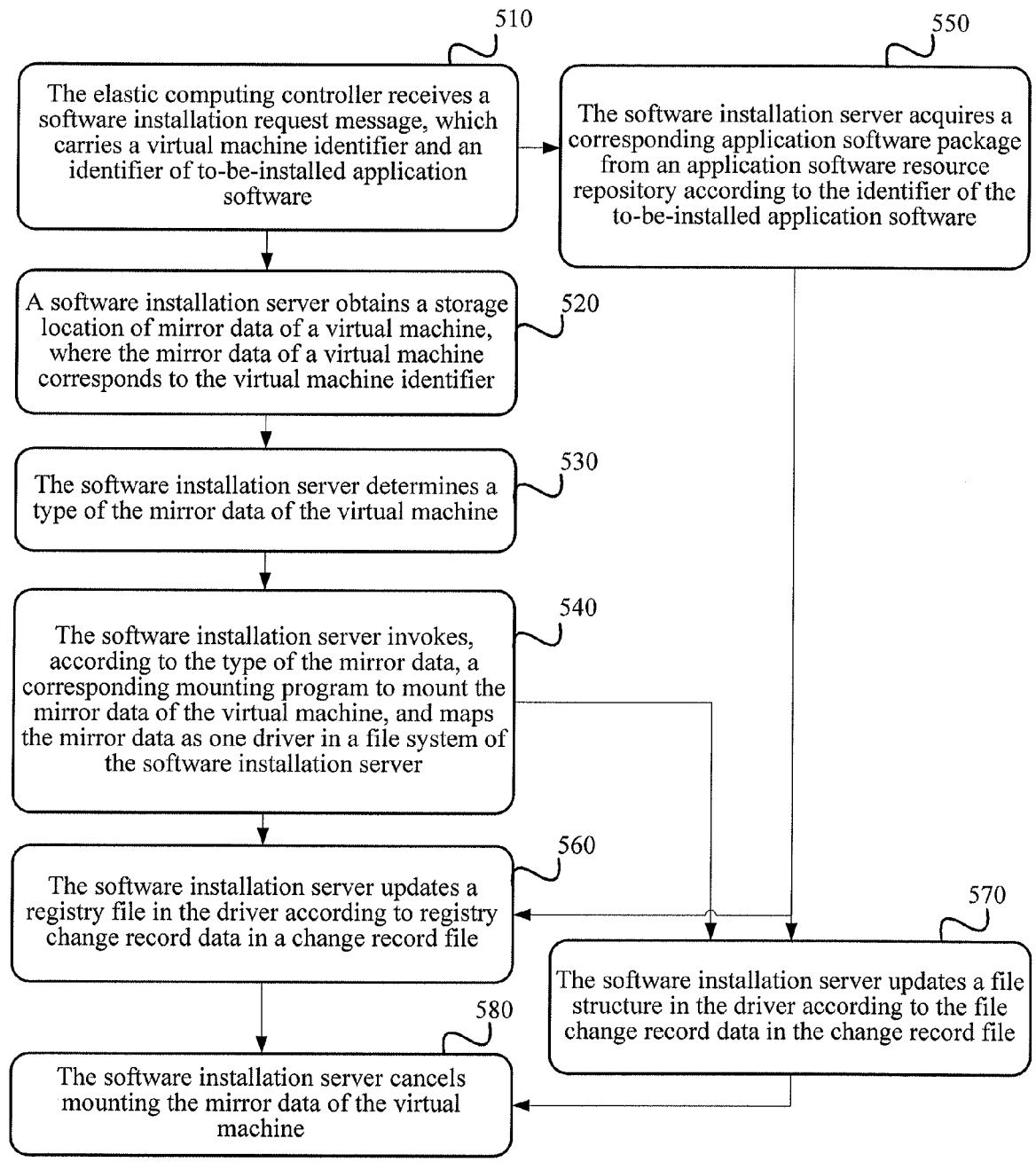
FIG. 5 is a flow chart of another application software installation method according to an embodiment of the present disclosure.

The embodiment of the present disclosure provides another application software installation method. The installation method is performed in a scenario shown in FIG. 3a and is based on the application software package created in the method shown in FIG. 2a, and is used to implement installation of software after a virtual machine is allocated for a user. For a specific procedure, reference may be made to FIG. 5.

In this embodiment, a management list stored by the elastic computing controller stores information such as an identifier of a physical host used to start each virtual machine, and a storage address of mirror data of each virtual machine. As shown in Table 1, Table 1 describes a case that mirror data is stored in an SAN. When one virtual machine is allocated for a certain user to use, the management list is read to indicate a physical host used to start the virtual machine, mirror data is read from a storage address of the mirror data of the virtual machine to load the mirror data, so that the virtual machine is started.

Step 510: The elastic computing controller receives a software installation request message, where the software installation request message may be sent by the user, and may also be sent by a virtual machine management system, for example that anti-virus software needs to be installed in each virtual machine in a designated scope. The software installation request message carries a virtual machine identifier and an identifier of to-be-installed application software.

Step 520: A software installation server obtains a storage location of mirror data of a virtual machine, where the virtual machine corresponds to the virtual machine identifier.

Optionally, in this embodiment, the software installation server performs message interaction with the elastic computing controller to obtain the storage location of the mirror data in the management list of the elastic computing controller, where the mirror data corresponds to the virtual machine VM1.

Step 530: The software installation server determines a type of the mirror data of the virtual machine.

For a specific method for determining the type of the mirror data, reference may be made to the description in step 430, which is not repeated herein.

Step 540: The software installation server invokes, according to the type of the mirror data, a corresponding mounting program to mount the mirror data of the virtual machine, and maps the mirror data as one virtual disk in a file system of the software installation server.

Step 550: The software installation server acquires a corresponding application software package from the application software resource repository according to the identifier of the to-be-installed application software.

Step 560: The software installation server updates a registry file in the virtual disk according to registry change record data in a change record file contained in the application software package.

Step 570: The software installation server updates a file structure in the virtual disk according to the file which is added or modified during the installation process and is in the application software package, and according to the file change record data in the change record file.

Step 580: The software installation server cancels mounting the mirror data of the virtual machine.

Figure 4:
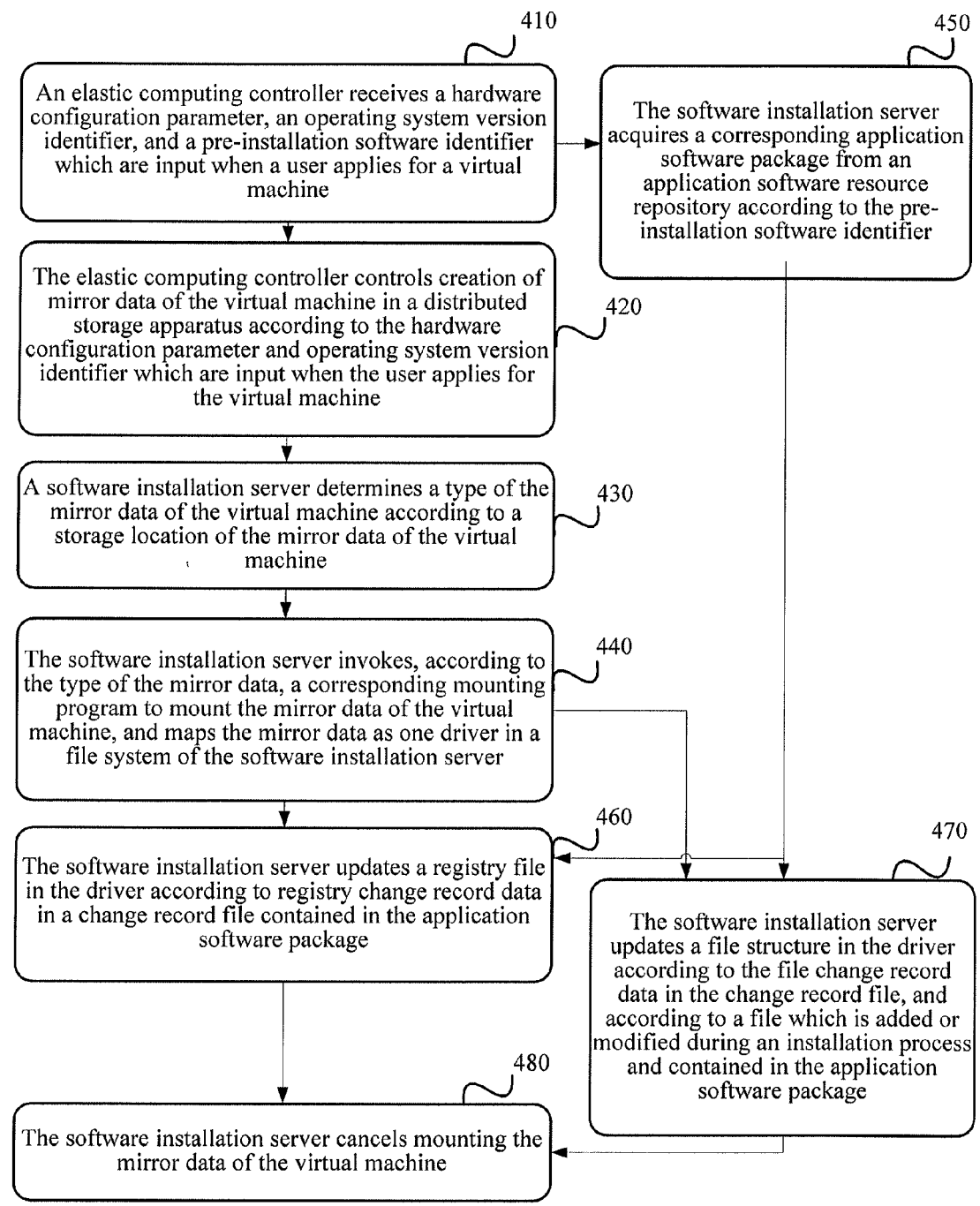
FIG. 4 is a flow chart of an application software installation method according to an embodiment of the present disclosure.

Specific processing manners of step 540 to step 580 are similar to those of step 440 to step 480 in FIG. 4, and are not repeated herein.

In the application software installation method provided by the embodiment of the present disclosure, the mirror data of the virtual machine where the application software is to be installed is mounted first, and after the mounting is completed, the mirror data of the virtual machine is mapped as one virtual disk in the file system of the software installation server. The registry file in the driver is updated according to the registry change record data of the application software package; and the file structure in the virtual disk is updated according to the file added or modified during the installation process and the file change record data which are contained in the application software package, thereby achieving the objective of installing the application software. During the application software installation process, a browser or a client tool does not need to be installed in the virtual machine in advance, so that storage resources are saved, and at the same time, a user of the virtual machine does not need to perform complex operations, thereby reducing software installation difficulty for the user.

When the application software needs to be installed in a large number of virtual machines in a wide scope synchronously, the software installation solution provided by the embodiment of the present disclosure may control a process of installing the application software in each virtual machine from the perspective of the software installation server, thereby ensuring controllability of a software installation scope.

Embodiment 3

An application software installation method provided by an embodiment of the present disclosure not only is applicable to cloud computing infrastructure architecture shown in FIG. 3a, but also is applicable to other simple virtual machine application scenarios. In this case, each step shown in FIG. 4 may be implemented by a same physical device, but the basic principle is similar to FIG. 4.

Figure 6A:
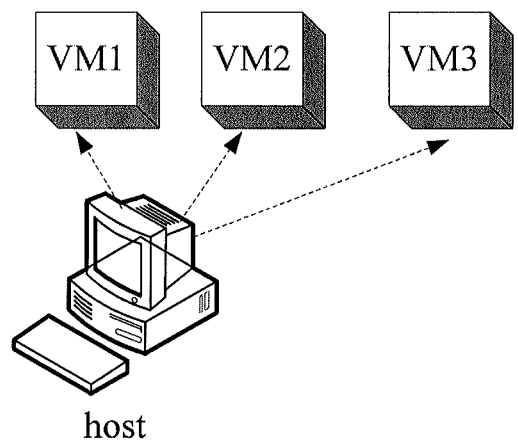
FIG. 6a is a schematic diagram of a deployment environment of another software installation system according to an embodiment of the present disclosure.

FIG. 6a is a schematic diagram of an application scenario provided by an embodiment of the present disclosure. Three virtual machines VM1, VM2, and VM3 need to be created in a physical host to implement parallel computing or a software test. An installation management module of the physical host creates a virtual machine according to a virtual machine creation requirement input by a user.

Figure 6B:
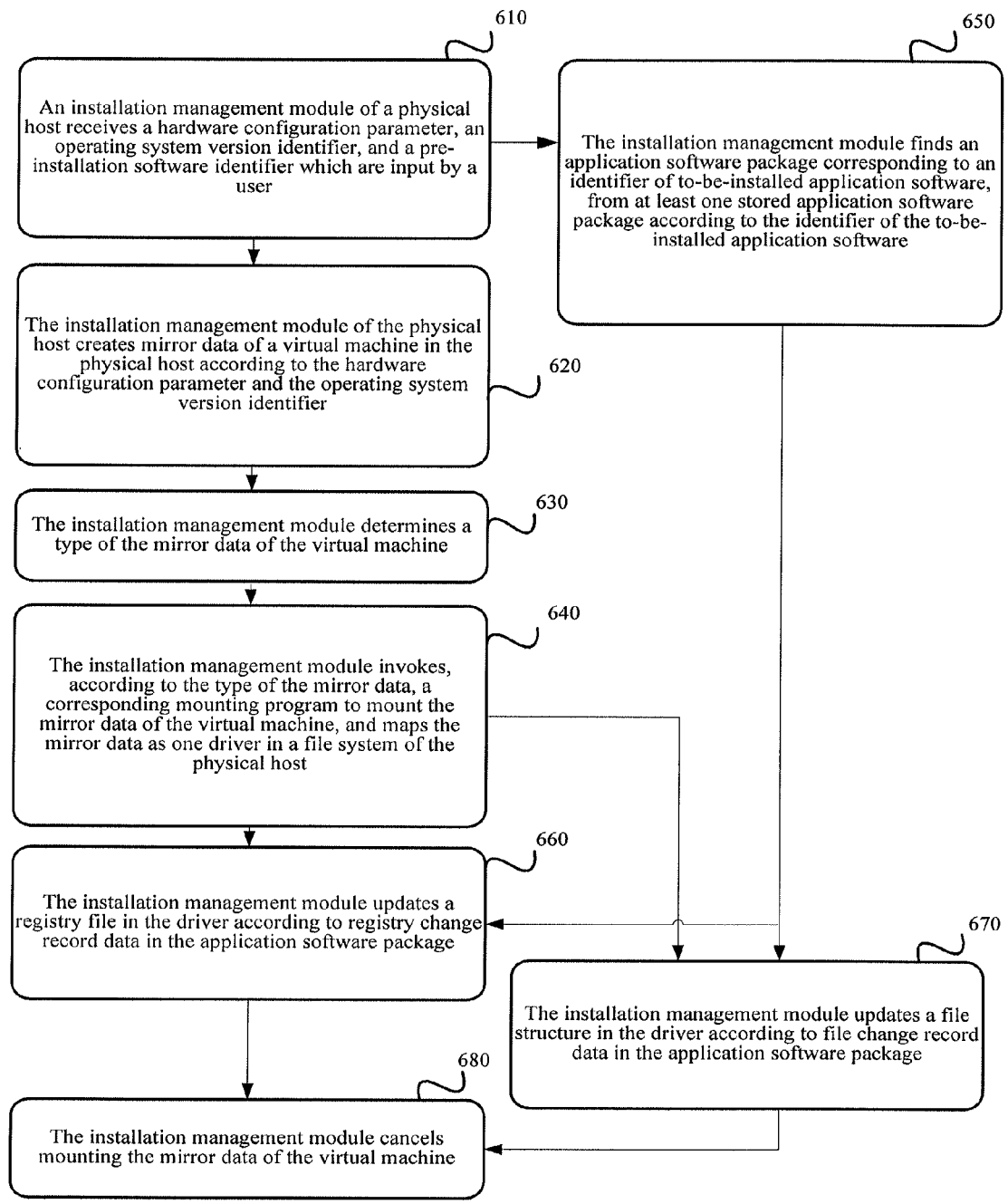
FIG. 6b is a flow chart of another application software installation method according to an embodiment of the present disclosure.

FIG. 6b is a flow chart of an application software installation method according to an embodiment of the present disclosure;

Step 610: The installation management module of a physical host receives a hardware configuration parameter, an operating system version identifier, and a pre-installation software identifier which are input by the user.

Optionally, the user may input a creation requirement through a user interface of the installation management module.

Step 620: The installation management module of the physical host creates mirror data of a virtual machine in the physical host according to the hardware configuration parameter and the operating system version identifier.

During the process of creating the mirror data of the virtual machine, one correspondence table storing a virtual machine identifier and a storage location of the mirror data of the virtual machine may be maintained, as shown in Table 3.

TABLE 3

| Virtual machine identifier | Storage address of mirror data of virtual machine |
|---|---|
| VM1 | E:/vmimages/vm1.QCOW |
| VM2 | E:/vmimages/vm2.vmdk |
| VM3 | E:/vmimages/vm2.vmdk |
| ... | ... |

Step 630: The installation management module determines a type of the mirror data of the virtual machine.

For a specific method for determining the type of the mirror data, reference may be made to the description in step 430, which is not repeated herein.

Optionally, the installation management module creates the mirror data of the virtual machine of a designated format in step 620, for example, QCOW. In this step, it may be determined that the type of the mirror data of the virtual machine is the designated format.

Step 640: The installation management module invokes, according to the type of the mirror data, a corresponding mounting program to mount the mirror data of the virtual machine, and maps the mirror data as one virtual disk in the file system of the physical host.

Step 650: The installation management module finds an application software package corresponding to an identifier of to-be-installed application software, from at least one stored application software package according to the identifier of the to-be-installed application software.

The application software package comprises a change record file, and a file modified or added during an installation process. The change record file includes registry change record data and file change record data.

Step 660: The installation management module updates a registry file in the virtual disk according to the registry change record data in the change record file contained in the application software package.

Step 670: The installation management module updates the file structure in the virtual disk according to the file which is added or modified during the installation process and is in the application software package, and according to the file change record data in the change record file.

Step 680: The installation management module cancels mounting the mirror data of the virtual machine.

Specific processing manners of step 640 to step 680 are similar to those of step 440 to step 480 in FIG. 4, and are not repeated herein.

The embodiment of the present disclosure provides an application example of the application software installation method shown in FIG. 1, which applied in a same physical device. Through the solution, operation steps of installing the application software in the virtual machine by the user can be simplified.

Embodiment 4

Figure 7:
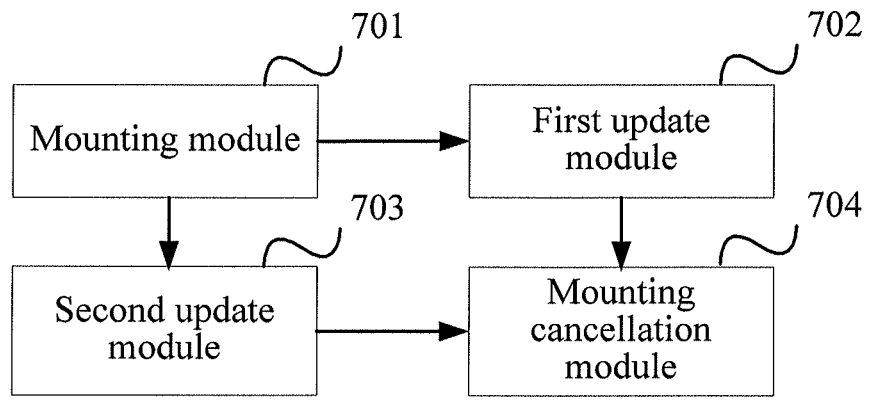
FIG. 7 is a schematic structural diagram of an application software installation apparatus according to an embodiment of the present disclosure.

Correspondingly, an embodiment of the present disclosure further provides an application software installation apparatus. As shown in FIG. 7, the apparatus includes a mounting module 701, a first update module 702 and a second update module 703, specifically as follows:

the mounting module 701 is configured to mount mirror data of a virtual machine, where the virtual machine is a virtual machine where application software is to be installed, and map the mirror data as one virtual disk in a local file system;

the first update module 702 is configured to update a registry file in the virtual disk according to registry change record data contained in an application software package of the application software, where the application software package comprises a file which is added or modified during an installation process, the registry change record data, and file change record data, and the registry change record data and the file change record data are obtained according to a difference between a host operating system environment before installation of the application software and a host operating system environment after the installation of the application software; and the second update module 703 is configured to update a file structure in the virtual disk according to the file change record data and the file which is added or modified during the installation process and contained in the application software package, thereby implementing installation of the application software in the virtual machine.

Optionally, the apparatus shown in FIG. 7 further includes:

a mounting cancellation unit 704, configured to, after the first update module 702 updates the registry file in the virtual disk and the second update module 703 updates the file structure in the virtual disk, cancel mounting the mirror data of the virtual machine.

Figure 8:
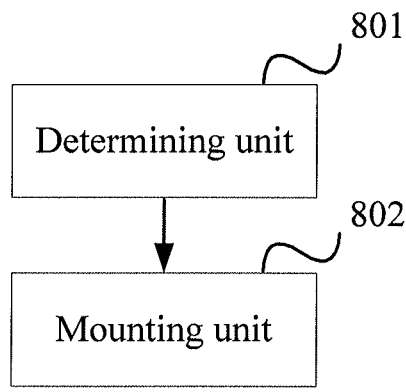
FIG. 8 is a schematic structural diagram of a mounting module according to an embodiment of the present disclosure.

Optionally, as shown in FIG. 8, the mounting module 701 includes:

a determining unit 801, configured to determine a type of the mirror data of the virtual machine; and a mounting unit 802, configured to invoke, according to the type of the mirror data determined by the determining unit 801, a corresponding mounting program to mount the mirror data of the virtual machine on a storage location of the mirror data of the virtual machine.

Figure 9A:
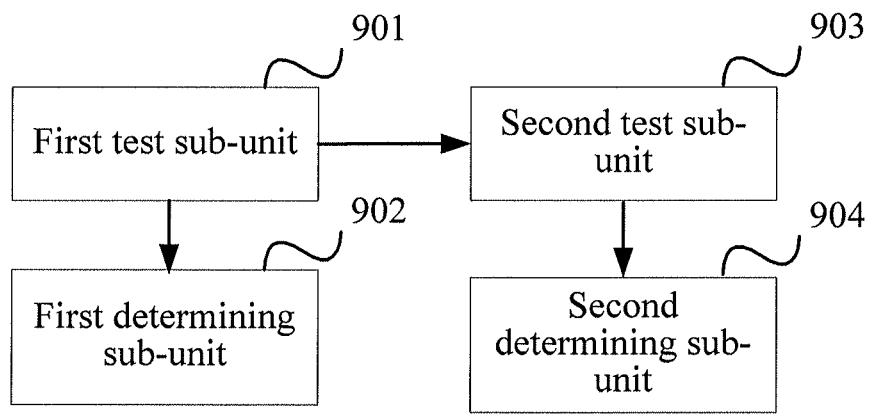
FIG. 9a is a schematic structural diagram of a first type of determining unit according to an embodiment of the present disclosure.

Optionally, as shown in FIG. 9a, the determining unit 801 includes:

a first test sub-unit 901, configured to test, according to the storage location of the mirror data of the virtual machine, whether a data head of the mirror data can be successfully read;

a first determining sub-unit 902, configured to, if the first test sub-unit 901 can successfully read the data head of the mirror data, determine a data format type of the mirror data according to a data format type field in the data head;

a second test sub-unit 903, configured to, if the first test sub-unit 901 cannot successfully read the data head of the mirror data, test whether the mirror data can be successfully parsed according to an RAW format; and a second determining sub-unit 904, configured to, if the second test sub-unit 903 can successfully parse the mirror data, determine that the data format type of the mirror data is the RAW format.

Figure 9B:
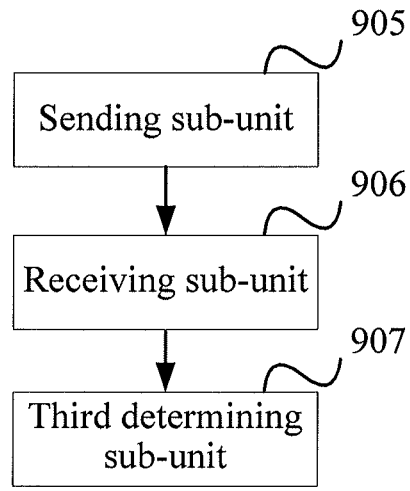
FIG. 9b is a schematic structural diagram of a second type of determining unit according to an embodiment of the present disclosure.

Optionally, as shown in FIG. 9b, the determining unit 801 includes:

a sending sub-unit 905, configured to send, to an elastic computing controller, a type confirmation request message carrying a virtual machine identifier or the storage location of the mirror data of the virtual machine;

a receiving sub-unit 906, configured to receive a type confirmation response message returned by the elastic computing controller; and a third determining sub-unit 907, configured to extract a carried type of the mirror data from the type confirmation response message received by the receiving sub-unit 906, where the type of the mirror data is found by the elastic computing controller according to the virtual machine identifier in the type confirmation request message from correspondence which is between the virtual machine identifier and the type of the mirror data and is saved when a virtual machine mirror file is created; or is found by the elastic computing controller according to the storage location in the type confirmation request message from correspondence which is between the storage location of the mirror data of the virtual machine and the type of the mirror data and is saved when the mirror data of the virtual machine is created.

Figure 10:
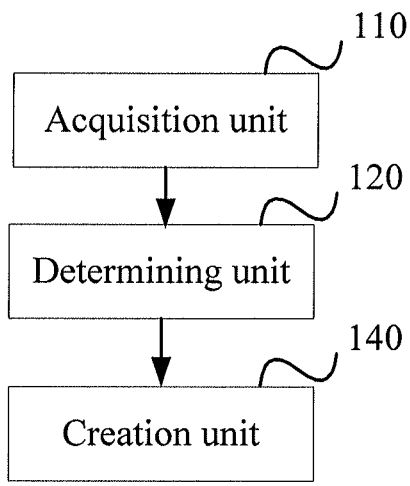
FIG. 10 is a schematic structural diagram of an application software package creation apparatus according to an embodiment of the present disclosure.

Referring to FIG. 10, an embodiment of the present disclosure further provides an application software package creation apparatus. The apparatus includes an acquisition unit 110, a determining unit 120 and a creation unit 140, where the acquisition unit 110 is configured to acquire a difference between a host operating system environment before installation of application software and a host operating system environment after the installation of the application software;

the determining unit 120 is configured to determine registry change record data and file change record data according to the difference obtained by the acquisition unit 110; and the creation unit 140 is configured to generate an application software package, where the application software package comprises the registry change record data and the file change record data which are determined by the determining unit 120, and a file which is added or modified in the host during a program installation process.

Figure 11:
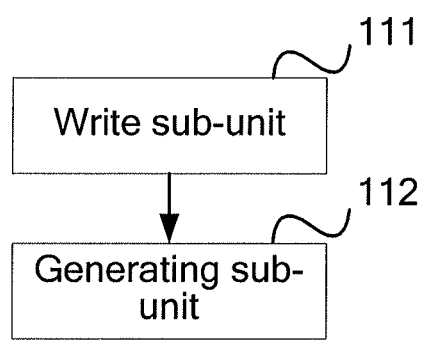
FIG. 11 is a schematic structural diagram of a creation unit according to an embodiment of the present disclosure.

Optionally, referring to FIG. 11, the creation unit 140 includes:

a write sub-unit 111, configured to write the registry change record data and the file change record data in a change record file; where for example, XML may be adopted to write the registry change record data and the file change record data in the change record file in a text format; and a generating sub-unit 112, configured to perform packaging processing on the change record file and the file which is added or modified during the installation program process, and generate the application software package of the application software.

Persons of ordinary skill in the art may understand that all or part of the steps of the method in the foregoing embodiments may be implemented by a program instructing relevant hardware. The program may be stored in a computer readable storage medium, such as a ROM/RAM, a magnetic disk or an optical disk Apparently, persons skilled in the art can make various modifications and variations to the present disclosure without departing from the scope or spirit of the disclosure. In view of this, the present disclosure is intended cover such modifications and variations, if these modifications and variations of the present disclosure fall within the scope of the claims of the present disclosure and their equivalents.

What is claimed is:

1. A method for installing application software onto a virtual machine, comprising:

mounting, by a processor, mirror data of the virtual machine where application software is to be installed, wherein the mirror data comprises at least an operating system file of the virtual machine and a user file, and mapping the mirror data as one virtual disk in a local file system;

updating a registry file in the virtual disk according to registry change record data in an application software package of the application software, wherein the application software package comprises a file that is added or modified during an installation process, the registry change record data, and file change record data, and the registry change record data and the file change record data are obtained according to a difference between a host operating system environment before installation of the application software and a host operating system environment after the installation of the application software; and updating a file structure in the virtual disk according to the file change record data and the file in the application software package, thereby implementing installation of the application software in the virtual machine.

2. The method according to claim 1, wherein mounting the mirror data of the virtual machine comprises:

determining a type of the mirror data of the virtual machine; and invoking, according to the type of the mirror data, a corresponding mounting program to mount the mirror data of the virtual machine on a storage location of the mirror data of the virtual machine.

3. The method according to claim 2, wherein determining the type of the mirror data of the virtual machine comprises:

according to the storage location of the mirror data of the virtual machine, testing whether a data head of the mirror data can be successfully read;

if the data head of the mirror data can be successfully read, determining a data format type of the mirror data according to a data format type field in the data head; and if the data head of the mirror data cannot be successfully read, testing whether the mirror data can be successfully parsed according to a RAW data or primary data format, and if the mirror data can be successfully parsed, determining that the data format type of the mirror data is the RAW data format.

4. The method according to claim 2, wherein determining the type of the mirror data of the virtual machine comprises:

sending, to an elastic computing controller, a type confirmation request message carrying a virtual machine identifier or the storage location of the mirror data of the virtual machine;

receiving a type confirmation response message returned by the elastic computing controller; and extracting a carried type of the mirror data from in the type confirmation response message, wherein the type of the mirror data is found by the elastic computing controller according to the virtual machine identifier in the type confirmation request message from correspondence which is between the virtual machine identifier and the type of the mirror data and is saved when a virtual machine mirror file is created; or is found by the elastic computing controller according to the storage location in the type confirmation request message from correspondence which is between the storage location of the mirror data of the virtual machine and the type of the mirror data and is saved when the mirror data of the virtual machine is created.

5. The method according to claim 1, wherein after updating the registry file in the virtual disk, and the updating the file structure in the virtual disk, the method further comprises:

canceling mounting the mirror data of the virtual machine.

6. The method according to claim 2, wherein after updating the registry file in the virtual disk, and the updating the file structure in the virtual disk, the method further comprises:

canceling mounting the mirror data of the virtual machine.

7. The method according to claim 1, wherein the application software package is created by:

acquiring the difference between the host operating system environment before installation of application software and the host operating system environment after the installation of the application software;

determining registry change record data and file change record data according to the difference; and generating an application software package which comprises the registry change record data, the file change record data and the file which is added or modified in the host during a program installation process.

8. The method according to claim 7, wherein acquiring the difference between the host operating system environment before the installation of the application software and the host operating system environment after the installation of the application software comprises:

replicating an installation package of the application software to the host operating system environment, wherein the installation package is provided by an application software provider, and the installation package comprises an installation program in an executable program format;

before and after running of the installation program, establishing snapshots for the host operating system environment separately; and comparing the snapshots of the host operating system environment before and after the running of the installation program, and obtaining the difference between the host operating system environment before the installation of the application software and the host operating system environment after the installation of the application software.

9. The method according to claim 7, wherein acquiring the difference between the host operating system environment before the installation of the application software and the host operating system environment after the installation of the application software comprises:

selecting a first host and a second host with exactly same operating system environments in advance;

replicating an installation package, provided by a provider of the to-be-installed application software, to an operating system environment of the second host, and running an installation program in the installation package in the second host; and performing comparison to find a difference between the operating system environments of the first host and the second host after the installation program in the installation package is run, so as to obtain the difference between the host operating system environment before the installation of the application software and the host operating system environment after the installation of the application software.

10. The method according to claim 7, wherein acquiring the difference between the host operating system environment before the installation of the application software and the host operating system environment after the installation of the application software comprises:

decompiling an installation program in an installation package provided by an application software provider, obtaining, from a decompiling result, an operator performed on the operating system environment, and from the obtained operator, determining an expected difference between the host operating system environment before the installation of the application software and the host operating system environment after the installation of the application software.

11. The method according to claim 7, wherein generating the application software package which comprises the registry change record data, the file change record data and the file which is added or modified in the host during the program installation process comprises:

writing the registry change record data and the file change record data in a change record file; and performing packaging processing on the change record file and the file which is added or modified in the host during the installation program process, and generating the application software package of the application software.

12. The method according to claim 8, wherein generating the application software package which comprises the registry change record data, the file change record data and the file which is added or modified in the host during the program installation process comprises:

writing the registry change record data and the file change record data in a change record file; and performing packaging processing on the change record file and the file which is added or modified in the host during the installation program process, and generating the application software package of the application software.

13. The method according to claim 9, wherein generating the application software package which comprises the registry change record data, the file change record data and the file which is added or modified in the host during the program installation process comprises:

writing the registry change record data and the file change record data in a change record file; and performing packaging processing on the change record file and the file which is added or modified in the host during the installation program process, and generating the application software package of the application software.

14. A virtual machine application software installation apparatus, comprising at least a processor executing program codes stored in a memory, wherein the program codes perform functions of a plurality of modules, wherein the plurality of modules comprise:

a mounting module, configured to mount mirror data of the virtual machine where application software is to be installed, wherein the mirror data comprises at least an operating system file of the virtual machine and a user file, and map the mirror data as one virtual disk in a local file system;

a first update module, configured to update a registry file in the virtual disk according to registry change record data in an application software package of the application software, wherein the application software package comprises a file which is added or modified during an installation process, the registry change record data, and file change record data, and the registry change record data and the file change record data are obtained according to a difference between a host operating system environment before installation of the application software and a host operating system environment after the installation of the application software; and a second update module, configured to update a file structure in the virtual disk according to the file change record data and the file in the application software package, thereby implementing installation of the application software in the virtual machine.

15. The apparatus according to claim 14, wherein the mounting module comprises:

a determining unit, configured to determine a type of the mirror data of the virtual machine; and a mounting unit, configured to invoke, according to the type of the mirror data determined by the determining unit, a corresponding mounting program to mount the mirror data of the virtual machine on a storage location of the mirror data of the virtual machine.

16. The apparatus according to claim 15, wherein the determining unit comprises:

a first test sub-unit, configured to test, according to the storage location of the mirror data of the virtual machine, whether a data head of the mirror data can be successfully read;

a first determining sub-unit, configured to determine a data format type of the mirror data according to a data format type field in the data head if the first test sub-unit can successfully read the data head of the mirror data;

a second test sub-unit, configured to test whether the mirror data can be successfully parsed according to a RAW data or primary data format if the first test sub-unit cannot successfully read the data head of the mirror data; and a second determining sub-unit, configured to, if the second test sub-unit can successfully parse the mirror data, determine that the data format type of the mirror data is the RAW data format.

17. The apparatus according to claim 15, wherein the determining unit comprises:

a sending sub-unit, configured to send, to an elastic computing controller, a type confirmation request message carrying a virtual machine identifier or the storage location of the mirror data of the virtual machine;

a receiving sub-unit, configured to receive a type confirmation response message returned by the elastic computing controller; and a third determining sub-unit, configured to extract a carried type of the mirror data from the type confirmation response message received by the receiving sub-unit, wherein the type of the mirror data is found by the elastic computing controller according to the virtual machine identifier in the type confirmation request message from correspondence which is between the virtual machine identifier and the type of the mirror data and is saved when a virtual machine mirror file is created; or is found by the elastic computing controller according to the storage location in the type confirmation request message from correspondence which is between the storage location of the mirror data of the virtual machine and the type of the mirror data and is saved when the mirror data of the virtual machine is created.

18. The apparatus according to claim 14, further comprising an application software package creation module, and the application software package creation module comprise:

an acquisition unit, configured to acquire a difference between a host operating system environment before installation of application software and a host operating system environment after the installation of the application software;

a determining unit, configured to determine registry change record data and file change record data according to the difference obtained by the acquisition unit; and a creation unit, configured to generate an application software package, wherein the application software package comprises the registry change record data and the file change record data which are determined by the determining unit, and a file which is added or modified in the host during a program installation process.

19. The apparatus according to claim 18, wherein the creation unit comprises:

a write sub-unit, configured to write the registry change record data and the file change record data in a change record file; and a generating sub-unit, configured to perform packaging processing on the change record file and the file which is added or modified during the installation program process, and generate the application software package of the application software.

20. A server for installing an application software onto a virtual machine, comprising a processor, wherein the processor is configured to mount mirror data of the virtual machine where application software is to be installed, wherein the mirror data comprises at least an operating system file of the virtual machine and a user file, and map the mirror data as one virtual disk in a local file system;

update a registry file in the virtual disk according to registry change record data in an application software package of the application software, wherein the application software package comprises a file which is added or modified during an installation process, the registry change record data, and file change record data, and the registry change record data and the file change record data are obtained according to a difference between a host operating system environment before installation of the application software and a host operating system environment after the installation of the application software; and update a file structure in the virtual disk according to the file change record data and the file in the application software package, thereby implementing installation of the application software in the virtual machine.

* * * * *